(12) United States Patent
Evans et al.

(10) Patent No.: US 8,533,237 B2
(45) Date of Patent: Sep. 10, 2013

(54) DATA STRUCTURE PARTITIONING IN PRODUCT DATA MANAGEMENT SYSTEMS

(75) Inventors: Frances Elizabeth Evans, Seattle, WA (US); Ori Ben-Haim, Huntington Beach, CA (US); Eric M. Leeson, Mason, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 13/241,403

(22) Filed: Sep. 23, 2011

(65) Prior Publication Data

US 2013/0080477 A1    Mar. 28, 2013

(51) Int. Cl.
*G06F 17/30*    (2006.01)

(52) U.S. Cl.
USPC ............... 707/804; 707/802; 706/11; 706/12; 706/45; 706/62

(58) Field of Classification Search
None
See application file for complete search history.

(56) References Cited

U.S. PATENT DOCUMENTS

| | | | |
|---|---|---|---|
| 5,307,261 A | 4/1994 | Maki et al. | |
| 5,311,424 A | 5/1994 | Mukherjee et al. | |
| 5,434,791 A | 7/1995 | Koko et al. | |
| 5,717,902 A | 2/1998 | D'Souza et al. | |
| 5,873,075 A | 2/1999 | Cochrane et al. | |
| 6,101,507 A | 8/2000 | Cane et al. | |
| 6,397,125 B1 | 5/2002 | Goldring et al. | |
| 6,801,822 B1 * | 10/2004 | Fujiwara et al. | 700/108 |
| 7,085,776 B2 * | 8/2006 | Callahan | 1/1 |
| 7,096,465 B1 | 8/2006 | Dardinski et al. | |
| 7,136,843 B2 | 11/2006 | Bigus et al. | |
| 7,299,202 B2 | 11/2007 | Swanson | |
| 7,343,364 B2 | 3/2008 | Bram et al. | |
| 7,493,344 B2 | 2/2009 | Wald et al. | |
| 7,526,468 B2 | 4/2009 | Vincent et al. | |
| 7,680,818 B1 | 3/2010 | Fan et al. | |
| 7,685,183 B2 | 3/2010 | Pace et al. | |
| 2002/0165724 A1 | 11/2002 | Blankesteijn | |
| 2003/0120902 A1 | 6/2003 | Kottapalli et al. | |
| 2003/0204527 A1 * | 10/2003 | Callahan | 707/104.1 |
| 2003/0212681 A1 | 11/2003 | Kasper, II | |
| 2004/0162741 A1 * | 8/2004 | Flaxer et al. | 705/7 |
| 2004/0250258 A1 | 12/2004 | Raghuvir et al. | |
| 2005/0125311 A1 | 6/2005 | Chidiac et al. | |

(Continued)

OTHER PUBLICATIONS

Denno et al, "Requirements on Information Technology for Product Lifecycle Management", 2004.*

(Continued)

*Primary Examiner* — Hung Le

(57) ABSTRACT

Methods for product data management and corresponding systems and computer-readable mediums. A method includes maintaining a hierarchical data structure for a complex item. The data structure includes a root node representing the complex item, at least one assembly node associated with a the partition node, and a plurality of part nodes each associated with the assembly node. The method includes defining at least two occurrences associated with the root node and corresponding to at least the root node and assembly node. The method includes defining at least one partition node representing a partition of the complex item, the partition node representing an organizational division of the occurrences of the associated with the root node that can be referenced in queries and navigation. The method includes associating at least two of the plurality of occurrences with the at least one partition node.

20 Claims, 6 Drawing Sheets

(56) References Cited

U.S. PATENT DOCUMENTS

| | | | |
|---|---|---|---|
| 2006/0143227 | A1 | 6/2006 | Helm et al. |
| 2006/0161894 | A1 | 7/2006 | Oustiougov et al. |
| 2007/0033204 | A1 | 2/2007 | Callahan |
| 2007/0239502 | A1* | 10/2007 | Babu ............................... 705/7 |
| 2008/0027781 | A1 | 1/2008 | vom Scheidt et al. |
| 2009/0132996 | A1 | 5/2009 | Eldridge et al. |
| 2010/0223593 | A1 | 9/2010 | Eldridge et al. |
| 2010/0274759 | A1 | 10/2010 | Takeuchi et al. |
| 2010/0274818 | A1* | 10/2010 | Chauvin et al. ............... 707/803 |
| 2011/0167037 | A1 | 7/2011 | Kaiser |
| 2011/0178998 | A1 | 7/2011 | Nizami et al. |
| 2011/0179059 | A1 | 7/2011 | Kaiser |
| 2011/0251975 | A1* | 10/2011 | Evans et al. ................... 705/348 |

OTHER PUBLICATIONS

IBM Production Development Integration Framework, The foundation for industry-wide integration to mange the product lifecycle, IBM PLM Solutions, May 2009.*

.NET Programmer's Guide Solid Edge with Synchronous Technology API, Solid Edge-Siemens PLM Software, Sep. 2010.*

Teamcenter Express Collaborative Product Data Management (cPDM), Self-Paced Training, SP15330-Version 5.0, Auguest 2009.*

Product Data Management and Software Configuration Management-Similarities and Differences, 2010.*

PCT International Search Report mailed Dec. 11, 2012 in connection with PCT International Application No. PCT/US2012/053822 filed Sep. 6, 2012 (4pages).

Written Opinion of the International Searching Authority dated Dec. 11, 2012 in connection with International Application No. PCT/US2012/053822 (8pages).

Anonymous: "Using the sparql query engine with protege-owl" Aug. 2008, 2 pages, XP002581821, http://web.archive.org/web/20080801225540/http://protege.stanford.edu/doc/sparql.

Anonymous: "XPath", Sep. 15, 2011, 2 pages, http//en.wikipedia.org/w/index.php?title=XPath&oldid=450655461.

Anonymous: "XQuery" Sep. 16, 2011, 6 pages, http://en.wikipedia.org/w/windex.php?title=Xquery&oldid=450824925.

Written Opinion of the International Searching Authority dated Mar. 14, 2013 corresponding to International Application No. PCT/KR2012/56287 filed Sep. 20, 2012 (3 pages).

PCT International Search Report mailed Mar. 14, 2013 corresponding to PCT International Application No. PCT/US2012/56287 filed Sep. 20, 2012 (3 pages).

* cited by examiner

DATA STRUCTURE PARTITIONING IN PRODUCT DATA MANAGEMENT SYSTEMS

CROSS-REFERENCE TO OTHER APPLICATION

This application shares some subject matter with commonly-assigned, concurrently filed U.S. patent application Ser. No. 13/241,467 for "Occurrence Management in Product Data Management Systems", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM system)

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes maintaining a hierarchical data structure for a complex item. The data structure includes a root node representing the complex item, at least one assembly node associated with a the partition node, and a plurality of part nodes each associated with the assembly node. The method includes defining at least two occurrences associated with the root node and corresponding to at least the root node and assembly node. The method includes defining at least one partition node representing a partition of the complex item, the partition node representing an organizational division of the occurrences of the associated with the root node that can be referenced in queries and navigation. The method includes associating at least two of the plurality of occurrences with the at least one partition node.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
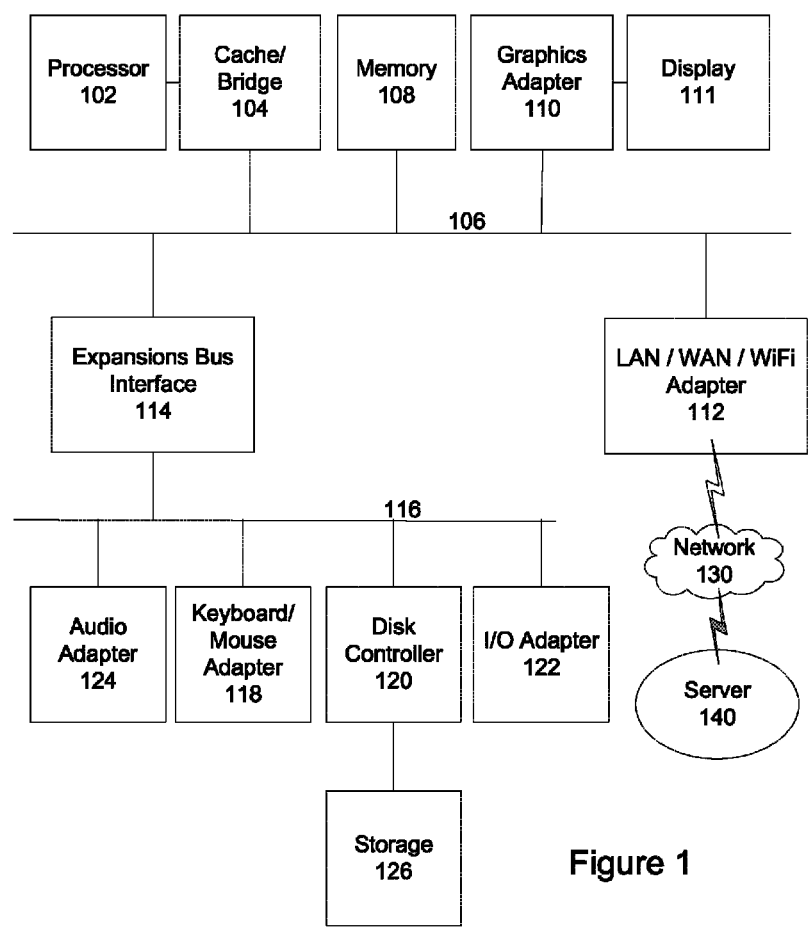
FIG. 1 depicts a block diagram of a data processing system in which an embodiment can be implemented.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

It is a valuable and typical practice to model products, factories and other complex entities composed of many constituents into a hierarchical structure of reusable elements. Examples of reusable elements include parts and assemblies, logical systems, fasteners, welds and factory cells. A single element can be instantiated many different times in a structure. Each instantiation represents a different usage of the same identically defined element and is referred to as an "occurrence" of that element. For example a car may have four identical wheels. There is a single definition of the wheel, but it is instantiated four times in the product structure of that car. There are therefore four wheel occurrences in the car corresponding to the front left, front right, rear left and rear right wheels.

The ability to model each occurrence explicitly and associate unique data to it while retaining the cohesiveness of the common definition element has been one of the key innovations in product structure management in recent years. The powerful features supported by an occurrence based model include the ability to define and scope specific information about the usage of an element to the exact context it applies and to work within nested contexts that override data from lower level to higher level contexts.

Occurrences by their definition always exist in some context, and so "context" is used to refer to the root note in the data structure of the product. For example, a front left wheel, belongs to the car context, whereas a left wheel might belong to an axle assembly context. Data associated to an occurrence is contextual and effectively "belongs" to the context. An occurrence, as used herein, represents a path through such a product data model of an assembly to a specific node in its proper context, including all parent nodes. In some implementations, an occurrence is concatenation of the occurrences in all nested contexts with suitable override rules applied in a precedence order.

For example, assume that all left wheels in a product structure are blue and all right wheels are red. The left wheel occurrence in the axle context gives the wheel the color blue and positions it orthogonal to the axle. However it's possible that when the axle is placed in a racing car the front axle is under a torgue that bends the axle slightly so the wheel is no longer perpendicular to the axle but at a slight offset. So to filly define the front left wheel occurrence, the system could use the re-usable wheel definition, the left wheel occurrence with any overrides from the definition (in this case the color Hue), and the front left wheel occurrence with any overrides from the wheel definition and the left wheel occurrence; i.e., in this case a slightly offset position relative to the axle. Color blue is not overridden so continues to be a property of the front left wheel, although that information is defined on the left wheel occurrence object not the front left wheel occurrence object.

An occurrence structure forms a configuration-specific tree, which can be derived from the generalized data model, and can be used with PLM and PDM systems to visualize and edit individual product configurations.

FIG. 1 depicts a Hock diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106.

Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

A given context such as a product or factory can have hundreds, thousands or even millions of occurrences. In order to work with such large numbers of occurrences, some kind of organizational scheme is needed. In certain structures that have many levels of hierarchically arranged reusable assemblies, the assembly hierarchy provides a reasonable mechanism to navigate and interrogate the occurrences. However, many products such as cars and ships do not get engineered in deep assembly structures. Similarly, non-product structures such as factory designs are often relatively flat with respect to the top level context.

Disclosed embodiments include techniques for sub-dividing the occurrences in a context into logical "partitions" or groupings that are useful for organizational purposes. To facilitate navigation, various embodiments can also arrange the partitions of a context hierarchically.

One problem with traditional PLM systems is that they do not provide sufficient mechanisms for arranging content of a product (or process, system, factory, etc., all generically referred to as "product" herein) into a meaningful organizational scheme. A PLM system can support structure management, i.e., the hierarchical decomposition of reusable elements of a product or other entity. However, the creation of a parent-child link in such a structure carries with it a set of specific semantics and behaviors which are not desirable for all situations. Each structure link implies an instantiation of the child in the context of its parent and all higher level contexts. Logically, but not necessarily literally, an occurrence of the child item will be created in each higher level node in the hierarchy and this occurrence will be used for computing transforms, occurrence data overrides, quantity and attribute rollups etc.

Figure 2:
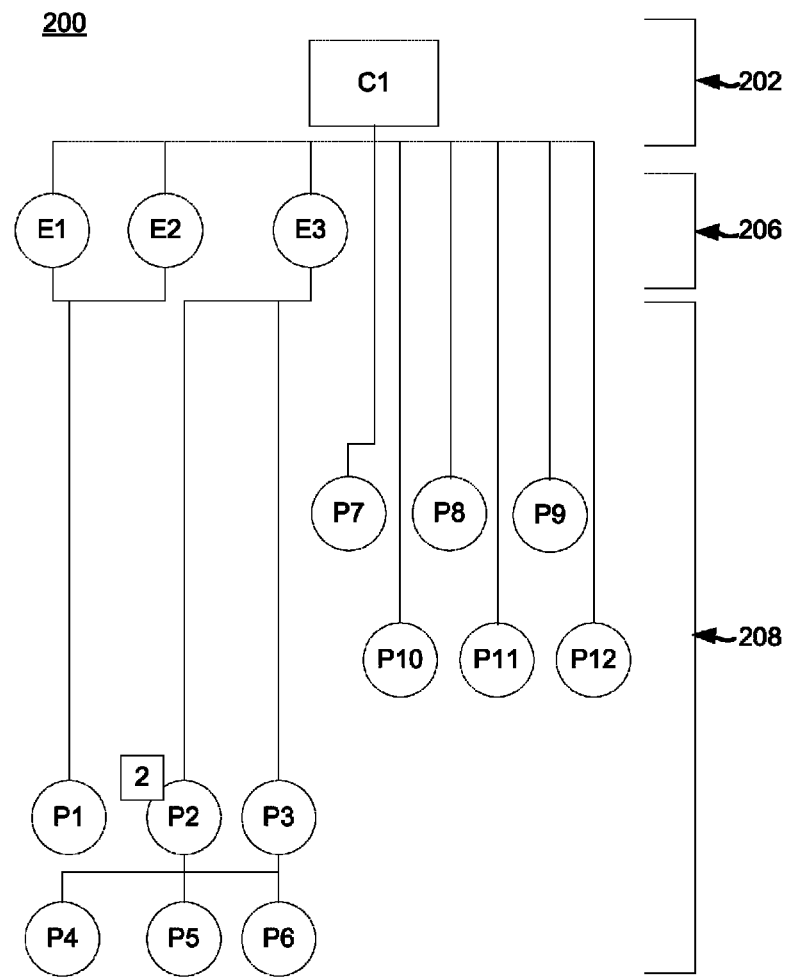
FIGS. 2 and 4 depict examples of a product structure as may be maintained in a PDM system.

FIG. 2 depicts an example of a product data structure 200 as may be maintained in a PDM system. In this example, the product structure 200 is represented as a hierarchical tree, using lines to show relationships between the nodes, with some nodes doubly-connected as being children of multiple parent nodes.

The top or root node 202 may indicate the overall context or product described by the structure 200, denoted as "C1".

The next level of nodes 206 can represent end items, such as assemblies, denoted as E1, E2, and E3. For example, in a vehicle, this could be a brake or axle assembly, a lighting system assembly, or otherwise.

The next level of nodes 208 can represent the sub-components of each of the corresponding assemblies, including parts or subassemblies, and are denoted as P1-P12. Note the "2" at P2, which indicates that two identical P2 instances are present, each with children P4 and P5. The child nodes of P3 are P5 and P6. P7-P12 are children of the context/root node 202; this is an indication of a relatively "flat" context structure in that many of the nodes are direct children of the root node.

Figure 3:
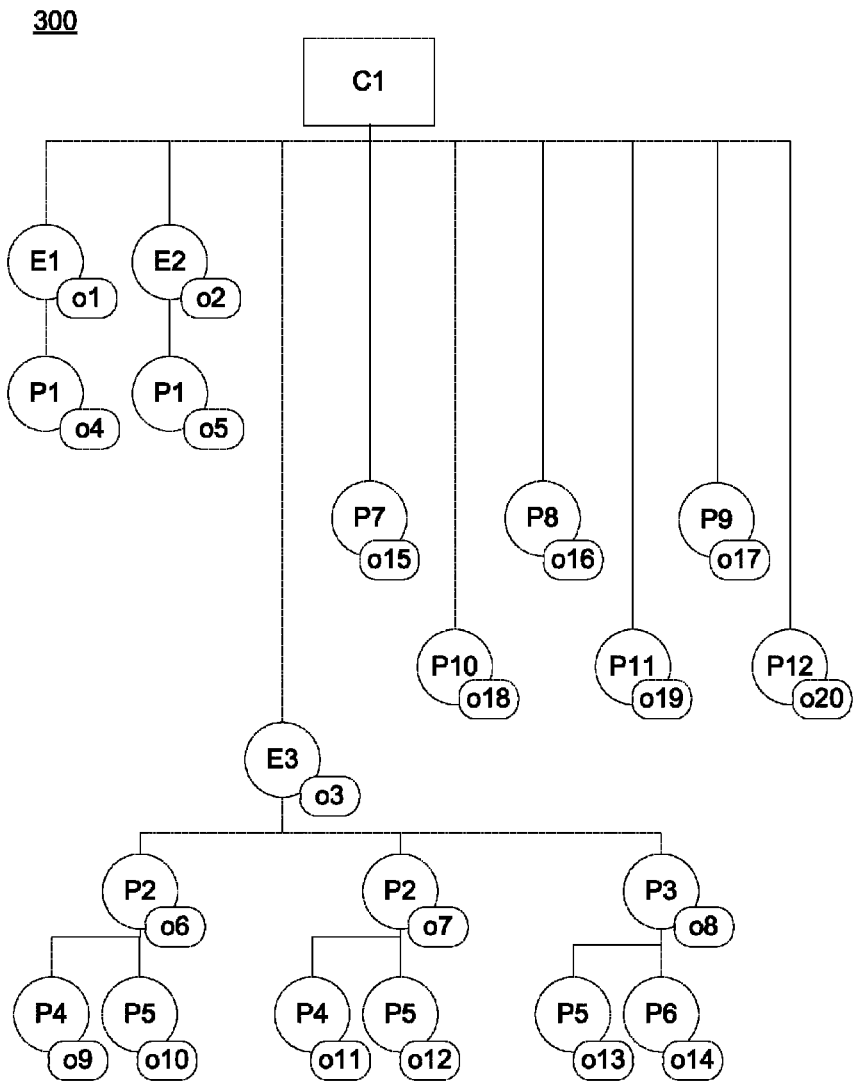
FIGS. 3 and 5 illustrate occurrences in a product structure.

FIG. 3 illustrates occurrences in a product structure 300 that corresponds to product structure 200.

In this figure, each separate occurrence is labeled, denoted as o1-o20. Each occurrence is a unique "path" through the structure, and so various nodes are duplicated to show the different occurrences, including duplication of both P2 instances. Each occurrence in this figure is an "absolute" occurrence that specifically and uniquely identifies all of the included nodes in the path from the product context C1 to the specific occurrence node. Occurrence o10 defines the path C1-E3-P2-P5 and includes each context, end item, and part necessary to define that occurrence.

A conventional structure-based hierarchy is very unsuitable for creating purely organizational divisions or "partitions" of occurrences in a context. If conventional structure approaches were used as a means to model partitions, the partition nodes would instantiate "occurrences". This result is not desirable since the partition nodes are not logically re-usable or "instantiable" within a context and do not override occurrence data. If the partitions get re-organized, the organizational structure gets traversed and the "occurrence" links get re-computed and maintained. This is an unnecessary overhead in terms of data storage and performance. A further limitation of such an approach is that an occurrence always has a single parent which is reasonable for decomposition but is overly restrictive for partitions; e.g., a structure could have a spatial partition where a part on a spatial boundary appears in two partitions.

According to disclosed embodiments, a given context can have one or more Partition Schemes that sub-divide its occurrences in different ways for organizational purposes. Each element in the Partition Scheme is referred to herein as a "Partition" or "Partition Node." Various embodiments include the constructs of "Partition" and "Partition Scheme" and the related behaviors that make them valuable. Specific concepts disclosed herein can be considered in three major categories, including Partition Schemes, Partition Nodes, and Organizational Hierarchy.

A partition scheme, as used herein, divides the occurrences of a context into a number of different partition nodes that are used to organize the end items and aid navigation. According to various embodiments, a given context may have multiple partition schemes, each of which divides the context in a different manner for a given business purpose.

A partition scheme can be defined as comprehensive, in that the scheme partitions the entire set of occurrences in a context. A partition scheme can be defined as partial, such that the scheme partitions only a subset of the occurrences in a context.

In various embodiments, a partition scheme belongs to a context and is not re-used. However, it may be derived from a partition scheme template that applies a common identification and/or organizational hierarchy across many contexts.

A partition scheme can be defined as mutually exclusive (i.e., no occurrence can reside in more than one partition) or non-mutually exclusive (i.e., a given occurrence may appear in more than one partition). However, the partitions themselves can be logically defined as non-overlapping so that even in the non-mutually-exclusive case, the occurrence overlaps the boundaries of multiple partitions (e.g., a pipe that intersects two spatial partitions), not that the two partitions overlap each other in terms of their definition.

Figure 4:
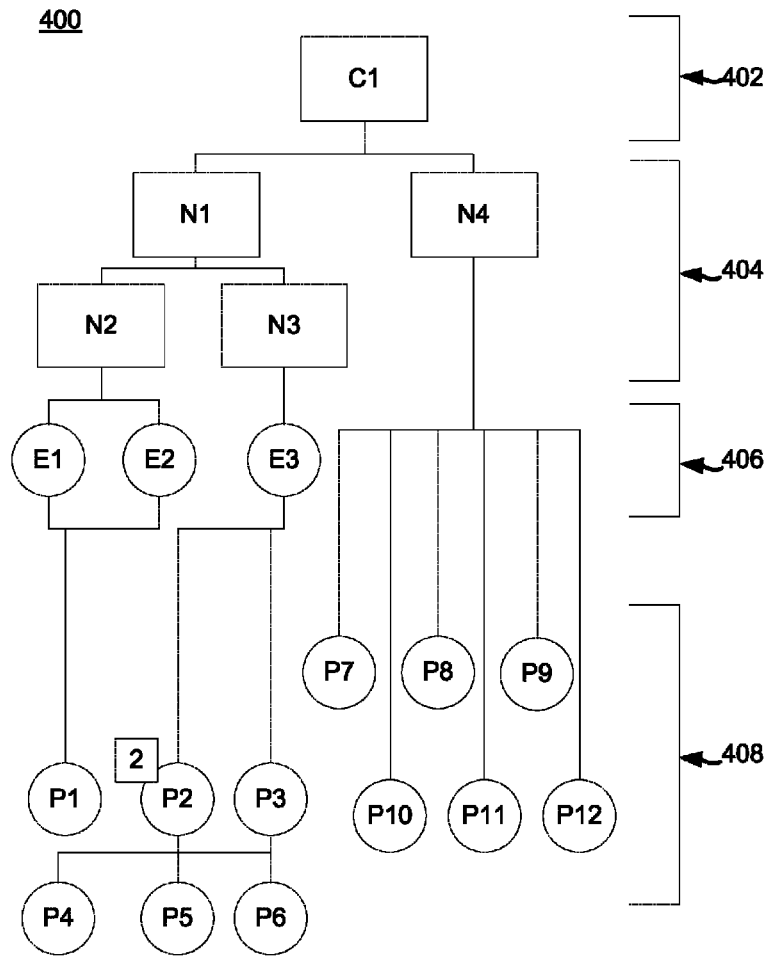

FIG. 4 depicts an example of a product data structure 400 as may be maintained in a PDM system using partitions as described herein. In this example, the product structure 400 is represented as a hierarchical tree, using lines to show relationships between the nodes, with some nodes doubly-connected as being children of multiple parent nodes. Note that the example of FIG. 4 generally corresponds to that of FIG. 2; where FIG. 2 would represent the "true" or formal structure, FIG. 4 illustrates the partition-based organizational hierarchy that can be used as a lightweight overlay and does not necessarily affect the occurrence data itself.

The top or root node 402 may indicate the overall context or product described by the structure 200, denoted as "C1".

The next level of nodes 404 can represent product/context partitions, denoted as N1, N2, and N3. These partition nodes can include, for example, different physical sections of the product, portions of the product covered by different work breakdown structures, electrical vs. mechanical structures, etc.

Figure 5:
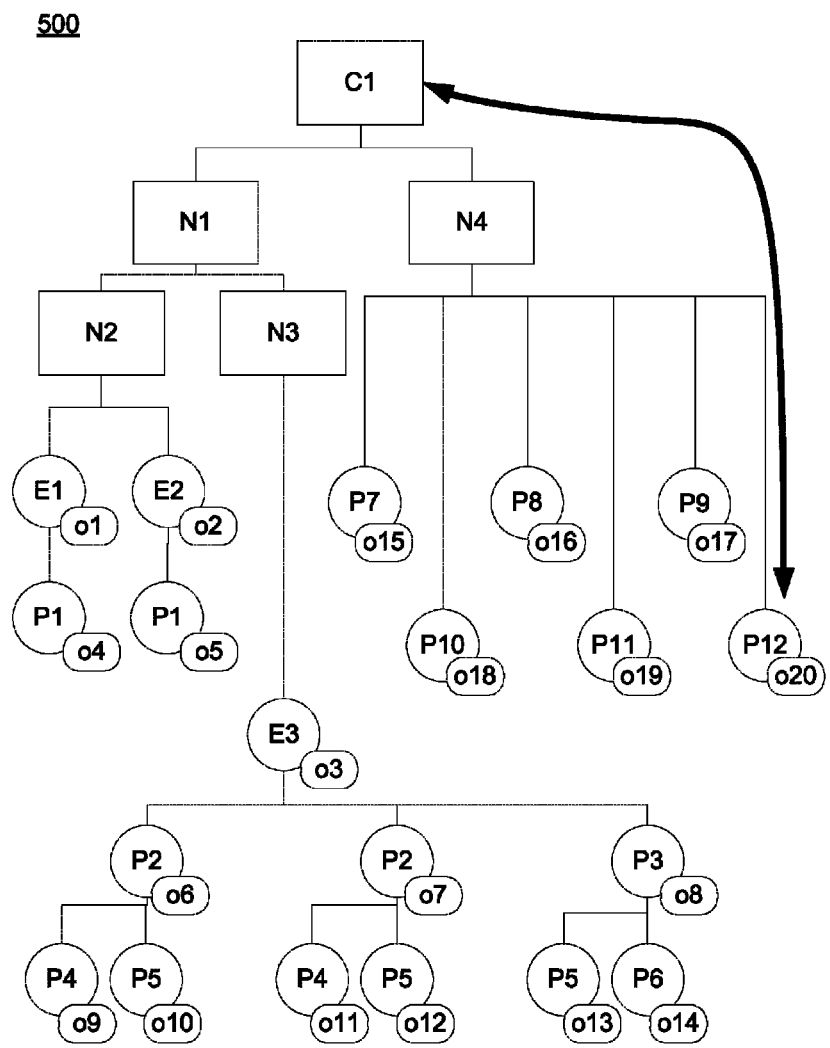

A partition node 404 (also referred to simply as a partition) contains one or more occurrences in a context, as illustrated in FIG. 5. According to various embodiments, each partition belongs to a partition scheme and will follow any business rules associated to that partition scheme e.g. mutual exclusivity. Since the partition scheme belongs to a context, so do all its partition nodes.

A partition will typically have an identifier. For example, a company can have identification schemes associated to their partitions and the partition ID will then be referenced in queries and navigation. Typically uniqueness of partition ID within a partition scheme is enforced.

The next level of nodes 406 can represent end items, such as assemblies, denoted as E1, E2, and E3. For example, in a vehicle, this could be a brake or axel assembly, a lighting system assembly, or otherwise.

The next level of nodes 408 can represent the sub-components of each of the corresponding assemblies, including parts or subassemblies, and are denoted as P1-P12. Note the "2" at P2, which indicates that two identical P2 instances are present, each with children P4 and PS. The child nodes of P3 are PS and P6.

FIG. 5 illustrates occurrences in a product structure 500 that corresponds to product structure 400.

In this figure, each separate occurrence is labeled, denoted as o1-o20. Each occurrence is a unique "path" through the structure, and so various nodes are duplicated to show the different occurrences, including duplication of both P2 instances. Each occurrence in this figure is an "absolute" occurrence that specifically and uniquely identifies all of the included nodes in the path from the product context C1 to the specific occurrence node. Occurrence o10 defines the path C1-N1-N3-E3-P2-P5 and includes each context, end item, and part necessary to define that occurrence. Occurrences o15-o20 are now also defined by partition node N4. The partition nodes N1 and N2 can act as an optional overlay for creating or organizing occurrences in a logical grouping.

A partition preferably does not introduce a new context for the occurrences it contains, and will always act in the context of the top level context of which it is a subdivision. Children allocated against a partition will be in the context of the top level context. In preferred embodiments, the partition cannot have an independent context and cannot ever have more than one context.

In various embodiments, the occurrence is still owned and controlled by its context. This is illustrated in FIG. 5 by the bold arrow showing occurrence o20 still controlled by context/root node C1. A similar relationship can exist for each occurrence.

Occurrences created against a partition can automatically assume the context of the partition. Existing occurrences allocated to a partition must have the same context as the partition. This is not a de-compositional relationship and does not affect the occurrence's true parent in the occurrence model.

A new occurrence can be created by associating an item to a partition. The context of that occurrence will be the top-level-context that the partition is sub-dividing. Partitions can have data attached to them and can have access rules controlling what can be included in them and by whom.

Various embodiments can also include a hierarchical relationship that is complementary to but distinct from an occurrence-based structure, as illustrated in FIG. 5. This organizational hierarchy can distinguished to a user in a user interface from traditional structural decomposition.

Figure 6:
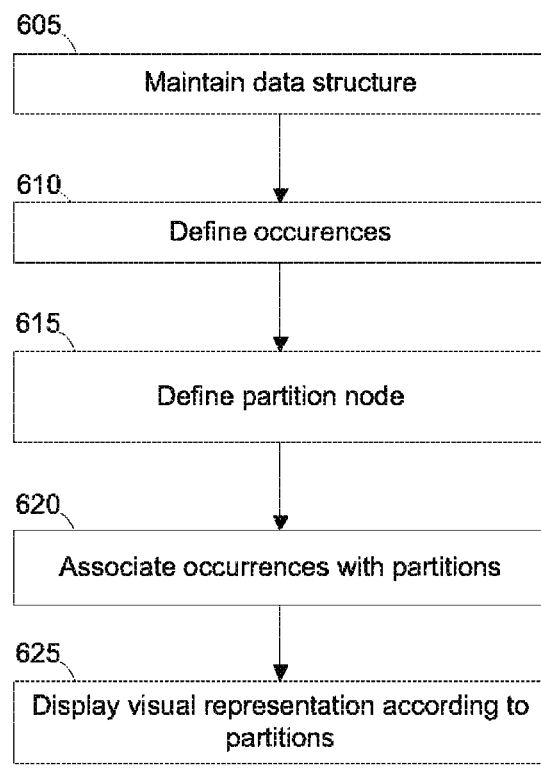
FIG. 6 depicts a flowchart of a process in accordance with disclosed embodiments.

Various embodiments can include one or more of the following attributes for this partition hierarchy. The organizational links are very lightweight with little or no data. Traversal of these structures is very fast. Partitions can contain other partitions or occurrences or both; this can be configurable such that some partition schemes disallow mixed children. Occurrences cannot contain partitions. Occurrences can have organizational relationships to each other, such that one occurrence appears to be below another even though they are actually in the same context. The organizational links do not have a geometric significance and are not traversed for geometric operations such as visualization and CAD re-positioning. Creation of an organizational link does not result in any new occurrences or any updates to existing occurrences FIG. 6 depicts a flowchart of a process in accordance with disclosed embodiments that may be performed, for example, by a PLM or PDM system.

The system maintains a hierarchical data structure for a product or other complex item (step 605). The data structure includes a root node representing a complex item, at least one assembly node associated with the context node, and a plurality of part nodes each associated with a respective one of the assembly node(s). The assembly node and the part node can represent assemblies and sub-assemblies, and the part node can represent an individual part of an assembly. The root node can be a context node.

The system defines a plurality of occurrences each according to a respective assembly node (step 610). Each Occurrence with be associated with the root node and the assembly node. One or more of the absolute occurrences can also be defined by a part node.

The system defines at least one partition node representing a partition of the complex item (step 615). The partition node is owned by the root node, and one or more of the occurrences are referenced in an organizational hierarchy by the partition node. The partition nodes can represent organizational divisions of the occurrences of the complex item, such as different physical sections of the product, portions of the product covered by different work breakdown structures, electrical vs. mechanical structures, etc., and can be referenced in queries and navigation. In some cases, the partition node belongs to a partition scheme and follows at least one business rule associated with the partition scheme.

The system associates at least two of the plurality of occurrences with the at least one partition node (step 620). In other cases, a partition might only contain one occurrence, though this is relatively infrequent, or may have no occurrences when first created. In such a case, it could be a placeholder under which new occurrences can be created.

The system can also display a visual representation of a least a portion of the complex item to a user according to a selected one of the partition nodes and the occurrences associated with the selected partition node (step 625). That is, the system can display a portion of the complex item based on a selected partition. In such a display, the organizational division corresponding to the partition can distinguished to a user in a user interface from a visual representation of the hierarchical data structure in a common display window. In sonic cases, a visual representation of the organizational division displays an organizational relationship between the two occurrences.

Certain behaviors can be used to illustrate the use of partitions in various embodiments to illustrate differences from conventional systems. For example, if a user inserts or removes a level in a partition hierarchy, the occurrence data should he preserved. If a user re-parents a node in partition hierarchy, i.e., moves it to a different location in the hierarchy, occurrence data should be preserved. A user may be able to place an occurrence in multiple partitions simultaneously; some partition types should allow this, while a traditional product structure does not. In various embodiments, a user can open a partition in the user application; in this case, the user should see and manipulate occurrence data in the overall product context even if intermediate levels are not displayed.

Disclosed embodiments include distinct mechanisms for constructing hierarchies of product data. In parallel with traditional occurrence instantiation structures, partition hierarchies are available that support organization and navigation of data in a context without disrupting the underlying instantiation paths. This allows for optimal performance since intensive structure update operations are only performed if the true occurrence structure has changed, the partition hierarchy can be manipulated cheaply.

In other embodiments, managed occurrences as described in the related application incorporated above can also be added to partitions and then manipulated and managed as described herein.

Certain types of Partition Schemes allow the same occurrence to have multiple parent partitions, something that occurrence structure relationships do not support. This addresses, for example, the use case of a pipe in a ship that crosses a spatial partition boundary and therefore exists in more than one partition at once. In various embodiments, a partition or partition node can be managed by the system as a revisable object that has effectivity and other features of other revisable objects. Disclosed embodiments provide significant distinct technical advantages over known systems. For example, disclosed embodiments make it practical fur engineers and other users to successfully model large complex products, particularly those with relatively flat structures. Disclosed embodiments facilitate concurrent engineering and enable enforcement of suitable security and access control models. The techniques disclosed herein allow a user to work on an element in product (or other) context so that it can readily be re-used in a different context. Increased re-use drives down engineering costs and improves cycle times.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
    maintaining a hierarchical data structure for a complex item, the data structure including a root node representing the complex item, at least one assembly node associated with the root node, and a plurality of part nodes each associated with the assembly node;
    defining at least two occurrences associated with the root node and corresponding to at least the root node and assembly node;
    defining at least one partition node representing a partition of the complex item, the partition node representing an organizational division of the occurrences associated with the root node that can be referenced in queries and navigation; and
    associating at least two of the plurality of occurrences with the at least one partition node.

2. The method of claim 1, wherein the organizational division includes one of a physical sections of the complex item, a portion of the complex item covered by a specific work breakdown structure, an electrical structures of the complex item, and a mechanical structure of the complex item.

3. The method of claim 1, wherein a visual representation of the organizational division can be distinguished to a user in a user interface from a visual representation of the hierarchical data structure in a common display window.

4. The method of claim 1, wherein the partition node is owned by the root node, and each occurrence is referenced in an organizational hierarchy by the partition node.

5. The method of claim 1, wherein a visual representation of the organizational division displays an organizational relationship between the two occurrences.

6. The method of claim 1, wherein the partition node belongs to a partition scheme and follows at least one business rule associated with the partition scheme.

7. The method of claim 1, wherein the partition node is associated with a unique partition ID that is referenced for the queries and navigation.

8. A data processing system comprising:
    a processor; and
    an accessible memory, the data processing system particularly configured to
        maintain a hierarchical data structure for a complex item, the data structure including a root node representing the complex item, at least one assembly node associated with the root node, and a plurality of part nodes each associated with the assembly node;
        define at least two occurrences associated with the root node and corresponding to at least the root node and assembly node;
        define at least one partition node representing a partition of the complex item, the partition node representing an organizational division of the occurrences associated with the root node that can be referenced in queries and navigation; and
        associate at least two of the plurality of occurrences with the at least one partition node.

9. The data processing system of claim 8, wherein the organizational division includes one of a physical sections of the complex item, a portion of the complex item covered by a specific work breakdown structure, an electrical structures of the complex item, and a mechanical structure of the complex item.

10. The data processing system of claim 8, wherein a visual representation of the organizational division can be distinguished to a user in a user interface from a visual representation of the hierarchical data structure in a common display window.

11. The data processing system of claim 8, wherein the partition node is owned by the root node, and each occurrence is referenced in an organizational hierarchy by the partition node.

12. The data processing system of claim 8, wherein a visual representation of the organizational division displays an organizational relationship between the two occurrences.

13. The data processing system of claim 8, wherein the partition node belongs to a partition scheme and follows at least one business rule associated with the partition scheme.

14. The data processing system of claim 8, wherein the partition node is associated with a unique partition ID that is referenced for the queries and navigation.

15. A non-transitory computer-readable medium encoded with executable instructions that, when executed, cause one or more data processing systems to:
    maintain a hierarchical data structure for a complex item, the data structure including a root node representing the complex item, at least one assembly node associated with the root node, and a plurality of part nodes each associated with the assembly node;

define at least two occurrences associated with the root node and corresponding to at least the root node and assembly node;

define at least one partition node representing a partition of the complex item, the partition node representing an organizational division of the occurrences associated with the root node that can be referenced in queries and navigation; and associate at least two of the plurality of occurrences with the at least one partition node.

16. The computer-readable medium of claim 15, wherein the organizational division includes one of a physical sections of the complex item, a portion of the complex item covered by a specific work breakdown structure, an electrical structures of the complex item, and a mechanical structure of the complex item.

17. The computer-readable medium of claim 15, wherein a visual representation of the organizational division can be distinguished to a user in a user interface from a visual representation of the hierarchical data structure in a common display window.

18. The computer-readable medium of claim 15, wherein the partition node is owned by the root node, and each occurrence is referenced in an organizational hierarchy by the partition node.

19. The computer-readable medium of claim 15, wherein a visual representation of the organizational division displays an organizational relationship between the two occurrences.

20. The computer-readable medium of claim 15, wherein the partition node belongs to a partition scheme and follows at least one business rule associated with the partition scheme.

* * * * *